US009923432B2

(12) United States Patent
Schmieder et al.

(10) Patent No.: US 9,923,432 B2
(45) Date of Patent: Mar. 20, 2018

(54) ELECTRIC MOTOR FOR A MOTOR VEHICLE WITH EMC MEASURE

(71) Applicant: AUDI AG, Ingolstadt (DE)

(72) Inventors: Walter Schmieder, Hepberg (DE); Klaus Rechberger, Ludwigsburg (DE); Bastian Heidler, Kranzberg (DE)

(73) Assignees: AUDI AG, Ingolstadt (DE); KARLSRUHE INSTITUT FÜR TECHNOLOGIE, Karlsruhe (DE)

( * ) Notice: Subject to any disclaimer, the term of this patent is extended or adjusted under 35 U.S.C. 154(b) by 250 days.

(21) Appl. No.: 14/966,441

(22) Filed: Dec. 11, 2015

(65) Prior Publication Data
US 2016/0172943 A1    Jun. 16, 2016

(30) Foreign Application Priority Data

Dec. 12, 2014  (DE) .................. 10 2014 018 432

(51) Int. Cl.
H02K 11/02    (2016.01)
H02K 11/22    (2016.01)
H02K 11/01    (2016.01)

(52) U.S. Cl.
CPC ........... H02K 11/022 (2013.01); H02K 11/01 (2016.01)

(58) Field of Classification Search
CPC ....... H02K 11/01; H02K 11/02; H02K 11/022
See application file for complete search history.

(56) References Cited

U.S. PATENT DOCUMENTS

| 4,528,473 A | * | 7/1985 | Tezuka | G11B 5/5521 310/156.64 |
| 5,821,652 A | * | 10/1998 | Hyypio | H02K 11/01 310/196 |
| 5,979,087 A | | 11/1999 | Bell et al. | |

(Continued)

FOREIGN PATENT DOCUMENTS

| CN | 1253406 A | 5/2000 |
| CN | 101145725 A | 3/2008 |

(Continued)

OTHER PUBLICATIONS

Chinese Search Report dated Nov. 3, 2017 with respect to counterpart Chinese patent application 2015109202037.

(Continued)

*Primary Examiner* — Dang Le
(74) *Attorney, Agent, or Firm* — Henry M. Feiereisen LLC

(57) ABSTRACT

An electric machine for a motor vehicle, includes a rotor, and a stator. The stator has a coil device for generating a magnetic rotary field for driving the rotor. the coil device has a soft magnetic flux-guiding device for guiding the rotary field, wherein the coil device is only partially arranged in the flux-guiding device, wherein at least one winding overhang of the coil device extends out of the flux guiding device into an environment of the stator. The electric also includes and an electrically conductive shielding element arranged on the at least one winding overhang and configured to electrically and/or electromagnetically shield the winding overhang against an environment, wherein the shielding element is connected to a frame potential connection of the electric machine.

9 Claims, 4 Drawing Sheets

(56) References Cited

U.S. PATENT DOCUMENTS

| | | | |
|---|---|---|---|
| 6,202,285 B1* | 3/2001 | Bell | H02K 15/12 |
| | | | 29/596 |
| 2001/0013731 A1 | 8/2001 | Shinohara et al. | |
| 2008/0088187 A1* | 4/2008 | Shao | H02K 11/022 |
| | | | 310/51 |
| 2013/0002060 A1 | 1/2013 | Moller et al. | |

FOREIGN PATENT DOCUMENTS

| | | |
|---|---|---|
| CN | 103441587 A | 12/2013 |
| CN | 103457380 A | 12/2013 |
| DE | 32 12 308 C2 | 10/1983 |
| DE | G 89 03 959.9 | 9/1990 |
| DE | 100 62 596 A1 | 6/2001 |
| DE | 101 05 983 A1 | 9/2002 |
| DE | 20 2010 009 940 U1 | 12/2011 |
| EP | 2 541 740 A1 | 1/2013 |
| GB | 270438 | 5/1927 |

OTHER PUBLICATIONS

English translation of Chinese Search Report dated Nov. 3, 2017 with respect to counterpart Chinese patent application 2015109202037.

* cited by examiner

ELECTRIC MOTOR FOR A MOTOR VEHICLE WITH EMC MEASURE

CROSS-REFERENCES TO RELATED APPLICATIONS

This application claims the priority of German Patent Application, Serial No. 10 2014 018 432.3, filed Dec. 12, 2014, pursuant to 35 U.S.C. 119(a)-(d), the disclosure of which is incorporated herein by reference.

BACKGROUND OF THE INVENTION

The present invention relates to an electric machine for a motor vehicle. The electric machine has a rotor and a stator. For driving the rotor, the has a coil device for generating a rotary field. At least one winding overhang of the coil device protrudes from a flux-guiding device of the stator, i.e., for example the laminated core, into an environment of the stator. The invention also includes a motor vehicle with the electric machine.

The following discussion of related art is provided to assist the reader in understanding the advantages of the invention, and is not to be construed as an admission that this related art is prior art to this invention.

In an electric machine a torque is generated by the stator by means of a magnetic rotary field and is applied to the rotor. For generating the rotary field, individual electric coils of a coil device are alternately impinged with an electric current. Switching of the currents can be accomplished by an inverter. During the switching, switching edges occur in the form of high-frequency AC current signals and/or AC voltage signals, i.e., generally in the form of electrical disturbances in the electric machine.

A particular problem encountered in a motor vehicle is that the electric machine is surrounded by a plurality of electrically conducting components into which the electrical disturbances can be transmitted, for example via capacitive coupling. In particular in hybrid vehicles and battery driven electric vehicles (BEV—battery electric vehicle—electric car) it was found that due to the high-voltage supply voltage of more than 60 Volt and/or due to the drive currents for the electric drive motor of more than 10 ampere, in particular more than 50 ampere, the electrical disturbances are of a magnitude so as to be emitted as electromagnetic interference radiation after being transmitted by the components, and as a result may for example interfere with radio reception in the motor vehicle.

In other words in such a case the electromagnetic compatibility (EMV or EMC electromagnetic compatibility) is no longer ensured.

The measures known from the state of the art do not allow reducing an electrical disturbance originating from the electric machine, i.e., an electric field of interference or electromagnetic radiation, without adversely affecting the efficiency of the electric machine.

It would therefore be desirable and advantageous to provide an EMC measure for a motor vehicle by which introduction of electrical disturbances into the motor vehicle can be reduced below a predeterminable threshold value

SUMMARY OF THE INVENTION

According to one aspect of the present invention, an electric machine for a motor vehicle, includes a rotor configured for mechanical coupling with a drive shaft; a stator having a coil device for generating a magnetic rotary field for driving the rotor and having a soft magnetic flux-guiding device for guiding the rotary field, wherein the coil device is only partially arranged in the flux-guiding device and at least one winding overhang of the coil device extends out of the flux guiding device into an environment of the stator; and an electrically conductive shielding element arranged on the at least one winding overhang and configured to electrically and/or electromagnetically shield the winding overhang against an environment, wherein the shielding element is connected to a frame potential connection of the electric machine.

According to the invention an electric machine for a motor vehicle is provided. The machine has a rotatably supported rotor, which can be mechanically coupled with a drive shaft. For this purpose the rotor can for example have a flange. The rotor can for example be rotatably supported in a housing of the electric machine. The electric machine also has a stator for a drive of the rotor. The stator has a coil device for generating a magnetic rotary field for driving the rotor. For guiding the rotary field, a soft magnetic flux device is provided, for example a laminated core as it is known from the state of the art. By means of the coil device one or more electrical coils can be formed. The coil device, however, is only partially arranged in the flux-guiding device, as is known. At least one winding overhang of the coil device extends out of the flux-guiding device into an environment of the stator.

In the electric machine according to the invention, a respective electrically conducting shielding element, which is electrically connected with the frame potential connection of the electric machine, is arranged on the at least one winding overhang and configured to electrically and/or electromagnetically shield the winding overhang against the environment. The frame potential connection can for example be formed by a flange of a housing of the electric machine via which the electric machine can be fastened on a carrier element in a motor compartment of the motor vehicle. The frame potential connection can also be formed by a so-called mass band, for example a litz wire.

The electric machine according to the invention has the advantage that an electrical disturbance emitted via the winding overhang, i.e., an electric field and/or an electromagnetic radiation, ends at the shielding element, which can be brought to the frame potential as a result of the electrically conducting connection to the frame potential connection.

In order to configure the shielding element appropriate for shielding an electric field and/or electromagnetic radiation, the electric conductivity of the shielding element and the electric conductivity of the electric connection between the shielding element and the frame potential connection has to be configured sufficiently high. The conductivity has to be sufficient so that an electrical disturbance emitted from the winding overhang is below a predetermined maximal value in an area beyond the shielding element. The maximal value can be determined by a person with skill in the art depending on the situation. The following parameters are particularly suited for adjusting the electrical conductivity: the material of the shielding element, which preferably includes aluminum and/or copper. The material thickness of the shielding element, wherein the shielding element can for example include a sheet metal which has a sheet thickness of at least 0.3 millimeters. A line cross section of the shielding element through which an electric equalizing current for equalizing the potential of the shielding element to the frame potential flows. The line cross section is preferably at least 0.3 square centimeters.

The respective shielding element of each winding overhang is preferably electrically insulated against the respective winding overhangs and/or against the flux-guiding device, i.e., for example the laminated core, and/or the flux-guiding device. This prevents eddy currents.

In order to prevent transmission of electrical disturbances from the winding overhang toward other electrically conducting components of the motor vehicle, it has proven particularly advantageous when the respective shielding element is at least partially arranged between the winding overhang and the rotor. This advantageously avoids that a potential fluctuation, which would otherwise be generated by the winding overhang in the rotor, is transmitted as AC current into a rotor shaft or drive shaft and from there emitted into the motor vehicle as disturbance radiation, because the shaft acts as antenna.

Correspondingly it has also proven advantageous when in addition or alternatively the respective shielding element is at least partially arranged between the winding overhang and the region in which the properly mounted shaft extends. This also effectively prevents or at least reduces a direct transmission of the electrical disturbances from the winding overhang toward the shaft.

In an embodiment a line cross section, i.e., an electrically conductive cross section, can be smaller in the respective shielding element than a diameter of the winding overhang, in particular smaller than a quarter of the diameter of the winding overhang, preferably smaller than an eight of the diameter of the winding overhang. This has the advantage that the formation of eddy currents can also be avoided or at least reduced within the shielding element. The conductive cross section is hereby the greatest dimension of the electrically conductive shielding element measured perpendicular to the current direction of the equalizing current in the shielding element.

In an embodiment the respective shielding element has at least one wire and/or a strip-shaped conducting element, i.e., a strip conductor. This results in a particularly efficient suppression of eddy currents. The respective wire and/or the strip-shaped conductor element are hereby preferably electrically coupled with the frame potential connection only at a single connection site, in particular at a respective end of the wire and/or conductor element. This also prevents a loop formation over the shielding element and over further electrically conductive elements. Compared to wires, strip-shaped conductor elements have the advantage that their effective shielding surface is greater at same weight.

In order to shield a sufficiently great surface of the winding overhang also when using a wire or a strip conductor, an embodiment of the invention provides that the respective shielding element is wound about the respective winding overhang. The shielding element is thereby rendered helical. In addition or alternatively the shielding element can have a comb structure and/or a fishbone structure. Such structures have also proven advantageous with regard to suppressing eddy currents.

The respective shielding element can for example be glued to the winding overhang. In a preferred embodiment the respective shielding element is enclosed in a carrier element, in particular in a cap or in a chamber. The carrier element is made of an electrically conductive material and the shielding element is held by the carrier element on the respective winding overhang. Provision of a carrier element has the advantage that the shielding element can be arranged on the respective winding overhang with little effort during mounting of the electric machine.

According to another advantageous feature of the invention, the carrier element can be pushed onto the winding overhang and/or is clipped on by means of a clip connection. This reduces the mounting effort to a single mounting step and with this the manufacturing costs for the electric machine.

According to another aspect of the invention, a motor vehicle includes an electric machine, wherein the electric machine includes a rotor mechanically coupled with a drive shaft via which the motor vehicle can be driven for a drive; a stator having a coil device for generating a magnetic rotary field for driving the rotor and having a soft magnetic flux-guiding device for guiding the rotary field, wherein the coil device is only partially arranged in the flux-guiding device and at least one winding overhang of the coil device extends out of the flux guiding device into an environment of the stator; and an electrically conductive shielding element arranged on the at least one winding overhang and configured to electrically and/or electromagnetically shield the winding overhang against an environment, said shielding element being connected to a frame potential connection of the electric machine, wherein the frame potential connection of the electric machine is electrically conductively connected with a frame potential of a high-voltage on board grid of the motor vehicle or with a body and/or a metallic support structure of the motor vehicle.

The coupling between the rotor and the drive shaft can be direct or can be accomplished via a transmission. The frame potential connection of the electric machine can be electrically conductively connected for example with a cross beam or a longitudinal beam or a floor panel, and/or with a frame potential of a high-voltage on-board grid of the motor vehicle. The term high-voltage means in this context an electric voltage, which is greater than 60 Volts, in particular greater than 100 Volts.

The motor vehicle according to the invention is preferably configured as a passenger car.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
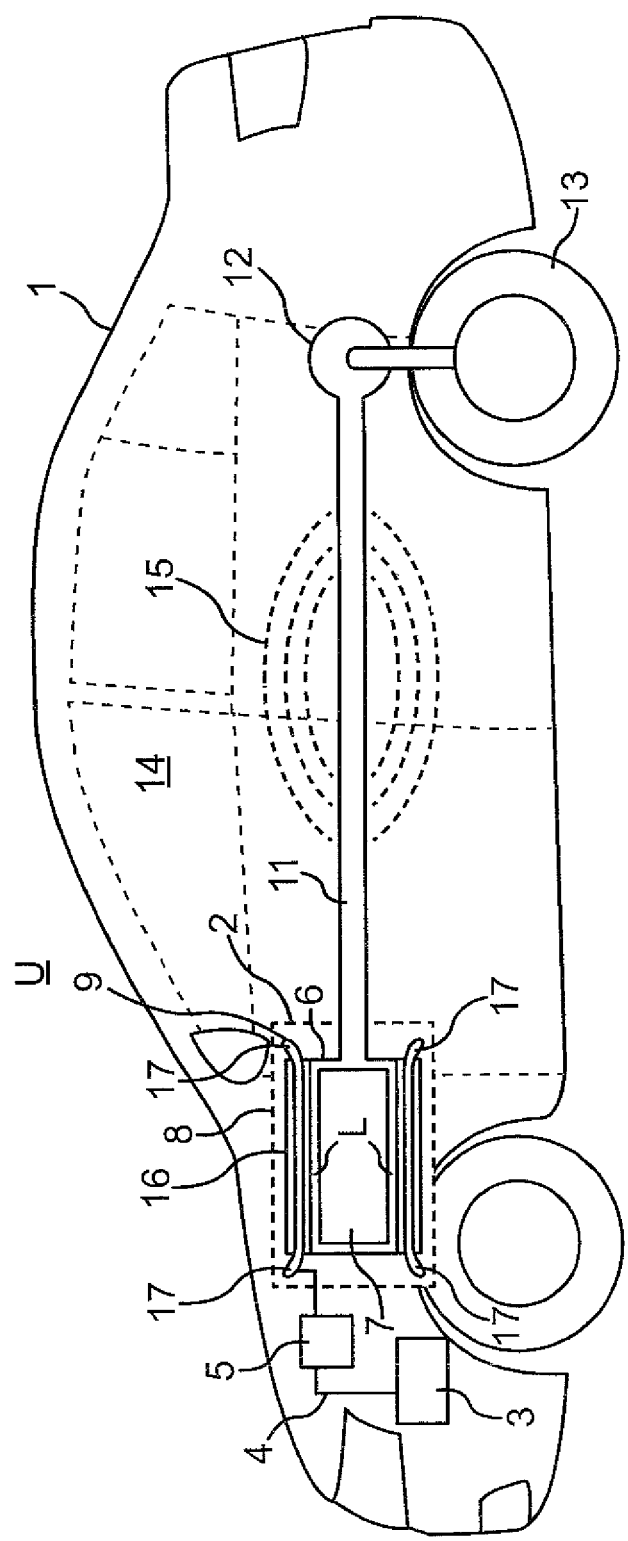
FIG. 1 is a schematic representation of an embodiment of the motor vehicle according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 1, which can be an automobile, in particular a passenger car. The motor vehicle 1 can for example be configured as hybrid vehicle with a (not shown) internal combustion engine and an electric machine 2 as electric drive motor. The motor vehicle 1 an also be a purely electrically driven motor vehicle with the electric machine 2.

The motor vehicle 1 can have a battery 3, in particular a high-voltage battery, for supplying the electric machine 2 with electric energy. The high-voltage battery 3 can be connected to an inverter or a converter 5 of the electric machine via an onboard grid 4, in particular a high-voltage onboard grid.

Figure 3:
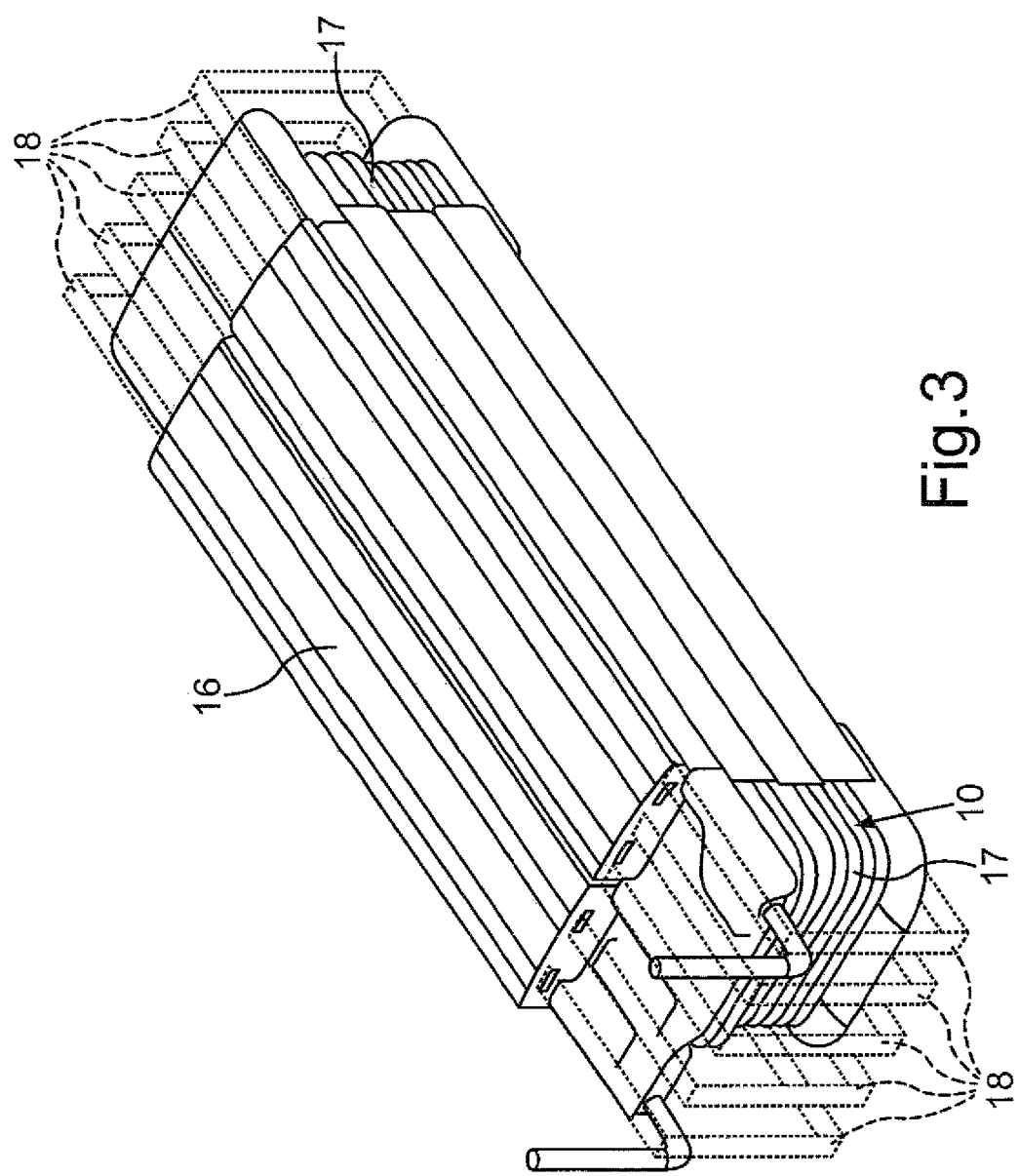
FIG. 3 is a schematic representation of a perspective view of an electric coil of a coil device of the electric machine of FIG. 2.

The electric machine 2 can for example be a synchronous machine or an asynchronous machine. The electric machine 2 can have a stator 6 and a rotor 7. The stator 6 and the rotor 7 can be arranged in a common housing 8. The stator 6 can have a coil device 9, which can have multiple individual electric coils 10 of which one is shown in FIG. 3. The stator 6, the rotor 7 and the coil device 9 can be configured in a manner known per se. By means of the converter 5 the coils 10 of the coil device 9 can be alternately supplied with a supply current from the battery 3. This results in a magnetic rotary field in an air gap L in a manner known per se, by which the rotor is driven.

The rotor 7 can be mechanically coupled with a drive shaft or short shaft 11, i.e., it can in particular be connected to the shaft 11 in rotative fixed relation with the shaft. Via the shaft 11 the torque can be transmitted for example to a differential 12 and from there to drive wheels 13 of the motor vehicle 1 for driving the motor vehicle 1.

Figure 2:
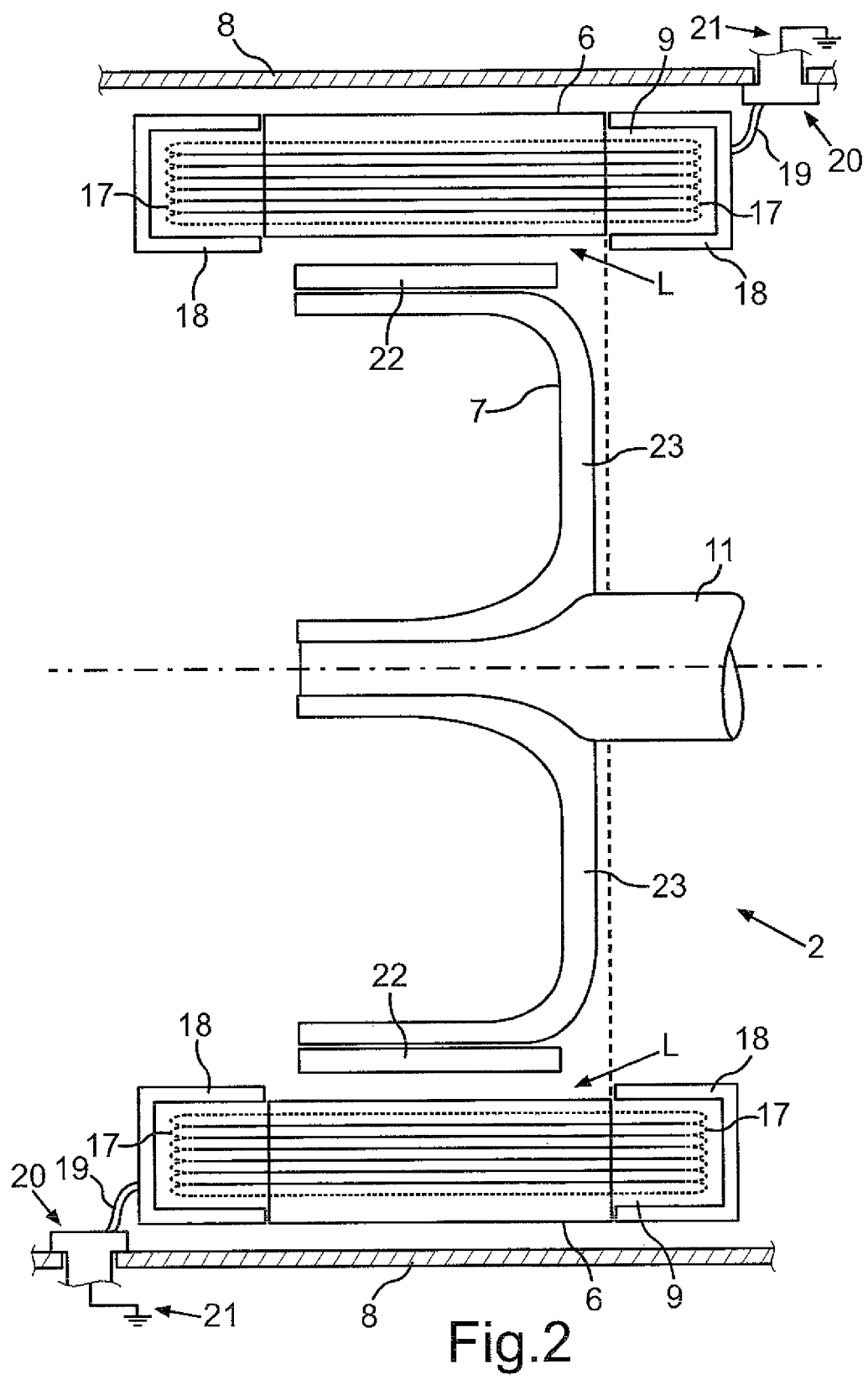
FIG. 2 is a schematic representation of a longitudinal section of an electric machine which can be provided in the motor vehicle of FIG. 1.
Figure 4:
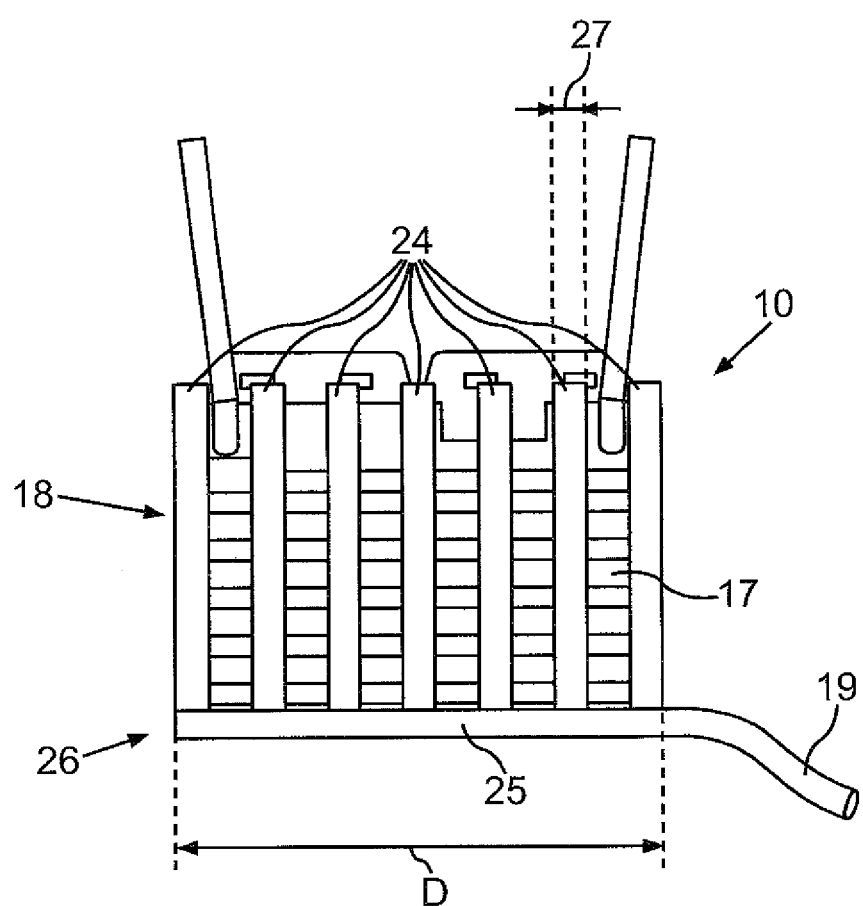
FIG. 4 is a schematic representation of a front view of the electric coil of FIG. 3 with a winding overhang and a shielding element.

For the following explanations reference is additionally made to FIG. 2, FIG. 3 and FIG. 4.

In conventional electric machines, electrical disturbances of the electric machine resulting from the described alternating supply of the coils with current and the switching edges that are hereby generated by the converter 5, may be coupled into neighboring components, in particular into the drive shaft 11 and the housing 8 via the open ends of the coils. From there they can for example be radiated off into a vehicle interior 14 for example as electromagnetic interfering radiation 15 or also into an environment U of the vehicle and thereby cause disturbances and/or exceed legal limits of the EMC.

In the motor vehicle 1 such a disturbance is prevented or at least reduced to a degree so as to not adversely affect the operation of electric devices.

In the electric machine 2 of the motor vehicle 1 the coil arrangement 9 is partially arranged in an electrically conductive flux-guiding device 16, which can for example be formed by a laminated core or laminated core segments. The open ends or winding overhangs 17 of the coils 10, which protrude out of the flux-guiding device 16, are electrically and/or electromagnetically shielded in the electric machine 2. On the winding overhangs 17 of each coil winding of the coils 10 a grounded shield or strip conductor, i.e., a shielding element 18 is arranged which is for example electrically connected via an electric cable 19, a wire or a litz wire with a frame potential connection 20 of the electric machine. The frame potential connection 20 can for example be formed by a flange for a screw connection of the housing 8 with a carrier part in a motor space of the motor vehicle 1. The appropriate type of shielding (conductor cross section, material, conductor thickness along the propagation direction of the electrical disturbances) can for example be determined based on the provided switching frequencies of the converter 5. The electric connection with the frame potential is symbolized in FIG. 2 by a frame potential sign 21. The frame potential can for example be provided by the body of the motor vehicle 1.

The shielding element 18 forms a grounded shield, i.e., a shield with constant potential, which prevents or dampens the coupling of disturbances from the winding overhang 17 into neighboring components on the electric machine 2.

This results in an effective reduction of the EMC disturbances, in particular in hybrid and BEV vehicles in which the coil device 9 is operated with a high voltage of more than 60 volts, in particular more than 100 Volts.

The shielding element 18 shields the winding overhang 17, in particular toward the rotor 7. The rotor 7 can for example have permanent magnets 22 and an electrically conductive carrier part 23 via which the magnetic force acting on the permanent magnets 22 is transmitted to the drive shaft 11. Into this carrier part 23 the electrical disturbance can be transmitted into the drive shaft 11 via a capacitive coupling of the winding overhangs 17. The shielding element 18 shields the winding overhang 17 in particular also directly against the drive shaft 11. Further it is in particular provided that the shielding element 18 also shields the winding overhang against the housing 18.

In the shielding element eddy currents can also be effectively prevented. For this the shielding element 18 can for example be formed by strip-shaped, spaced apart conductor elements 24, which for example can be electrically connected with the connection line 19 via an electrical coupling-conductor element 25. The coupling element 25 can be a further strip conductor or a wire. This results in a comb structure 26 of the shielding element 18 as shown in FIG. 4. A line cross section 27 of the strip-shaped conductor elements 24 can for example be smaller than a quarter of the diameter D of the winding overhang, preferably smaller than an eighth of the diameter of the winding overhang. The diameter D of the winding overhang 17 is for example in a range of 25 millimeters to 30 millimeters.

A further advantage of the electrical and/or electromagnetic shielding by means of the shielding element is that the amount of material for example of copper in the electric machine 2 can be reduced because no winding for a suppressor choke is required.

Overall the example shows how the invention provides a shielding of the coil ends in the electric machine for reducing EMC disturbances.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine for a motor vehicle, comprising:
   a rotor configured for mechanical coupling with a drive shaft;

a stator having a coil device for generating a magnetic rotary field for driving the rotor and having a soft magnetic flux-guiding device for guiding the rotary field, wherein the coil device is only partially arranged in the flux-guiding device and at least one winding overhang of the coil device extends out of the flux guiding device into an environment of the stator; and an electrically conductive shielding element arranged on the at least one winding overhang and configured to electrically and/or electromagnetically shield the winding overhang against an environment, said shielding element being composed of a plurality of strip-shaped, spaced apart conductor elements extending in a plane transversely to the winding overhang and connected with each other by a strip conductor connected to a frame potential connection of the electrical machine.

2. The electric machine of claim 1, wherein the shielding element is electrically insulated against the at least one winding overhang and/or against the flux-guiding device.

3. The electric machine of claim 1, wherein at least a portion of the shielding element is arranged between the winding overhang and the rotor, and/or in a region in which the drive shaft extends when properly mounted, and/or between the winding overhang and a housing of the electric machine.

4. The electric machine of claim 1, wherein a line cross section of the shielding element is smaller than a diameter of the winding overhang.

5. The electric machine of claim 4, wherein a line cross section of the shielding element is smaller than a quarter of the diameter of the winding overhang.

6. The electric machine of claim 4, wherein a line cross section of the shielding element is smaller than an eighth of the diameter of the winding overhang.

7. The electric machine of claim 1, wherein the strip conductor of the shielding element comprises a wire and/or a strip shaped conductor element.

8. The electric machine of claim 1, wherein the respective shielding element is wound about the at least one winding overhang and/or has a comb structure and or a fishbone structure.

9. A motor vehicle, comprising:

an electric machine, said electric machine comprising a rotor mechanically coupled with a drive shaft;

a stator having a coil device for generating a magnetic rotary field for driving the rotor and having a soft magnetic flux-guiding device for guiding the rotary field, wherein the coil device is only partially arranged in the flux-guiding device and at least one winding overhang of the coil device extends out of the flux guiding device into an environment of the stator; and an electrically conductive shielding element arranged on the at least one winding overhang and configured to electrically and/or electromagnetically shield the winding overhang against an environment, said shielding element being composed of a plurality of strip-shaped, spaced apart conductor elements extending in a plane transversely to the winding overhang and connected with each other by a strip conductor connected to a frame potential connection of the electric machine, wherein the frame potential connection of the electric machine is electrically conductively connected with a frame potential of a high-voltage on board grid of the motor vehicle or with a body and/or a metallic support structure of the motor vehicle.

* * * * *